UNITED STATES PATENT OFFICE.

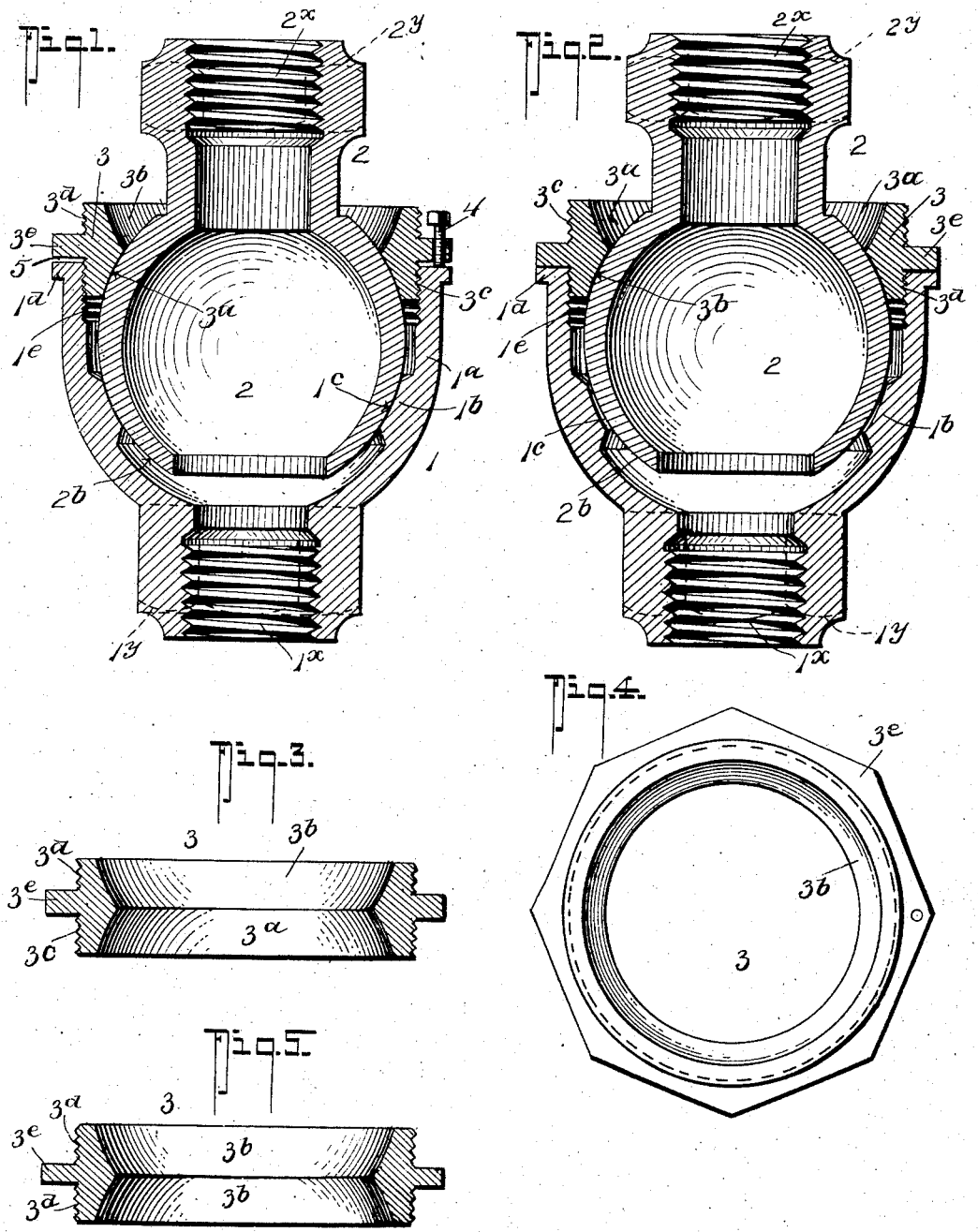

HENRY S. STUCY, OF LOUISVILLE, KENTUCKY.

PIPE-COUPLING.

No. 846,704.  Specification of Letters Patent.  Patented March 12, 1907.

Application filed September 6, 1906. Serial No. 333,557.

*To all whom it may concern:*

Be it known that I, HENRY S. STUCY, residing at Louisville, in the county of Jefferson and State of Kentucky, have invented a new and Improved Pipe-Coupling, of which the following is a specification.

My invention relates to certain new and useful improvements in pipe-couplings of the flexible type having provisions in virtue of which the coupling may be used either as a steam-pipe coupling or as a water or other like low-pressure fluid-pipe coupling.

Primarily my invention has for its object to provide a coupling of this type of a very simple and effective construction with as few coöperative parts as possible and which will readily and effectively serve its intended purposes.

Generically, my invention comprises a ball-and-socket joint provided with an improved reversible bearing-ring having provisions in virtue of which the ball and socket will have a tight connection under one adjustment of the ring and a loose connection under another adjustment thereof.

The essence of my present invention lies in the peculiar type of bearing-ring and the means of securing it in place on the bell portion of the socket to coöperate with the ball.

With other objects in view than have been heretofore specified the invention also includes certain novel features of construction, combination, and arrangement of parts, all of which will be first described in detail and be then specifically pointed out in the claims, reference being had to the accompanying drawings, in which—

Figure 1 is a vertical longitudinal section of my invention, showing the position of the parts when adjusted to effect a tight joint, as when my invention is to be used to connect liquid-conveying pipes. Fig. 2 is a similar view showing the parts adjusted to effect a loose joint for steam-pipe couplings. Fig. 3 shows a bearing-ring detached and in longitudinal section. Fig. 4 shows the ring in end elevation, and Fig. 5 shows a detailed view of a modified form of ring.

Referring now to the accompanying drawings, in which like numerals and letters of reference indicate like parts in all of the figures, 1 designates the socket member of the joint, which has a bell portion $1^a$ provided on its inner wall with a bearing-flange $1^b$, having a spherical bearing-surface $1^c$ on the same radius of curvature as the outside spherical bearing-surface $2^b$ of the ball member 2 on the joint. The bell $1^a$ has a flange $1^d$ at its outer edge and is internally threaded at $1^e$ to receive a bearing-ring 3. The ring 3 in my present invention has two equal spherical bearing-surfaces $3^a$ and $3^b$ on its inner side and a pair of threaded portions $3^c$ and $3^d$ of unequal length on its outer face. Between the threaded portions $3^c$ and $3^d$ in the ring 3 the ring is provided with a nut-like flange $3^e$ to coöperate with the flange $1^d$, as shown. A set-screw 4 passes through the flange 3 to lock the ring in position and prevent its becoming unscrewed from the socket member of the joint.

When the parts are to be used in the position shown in Fig. 1 for fluid-pipes, then the ring has its longer threaded portion $3^c$ in engagement with the threaded part $1^e$ of the bell $1^a$, with its flange $3^e$ not in touch with the flange $1^e$ of the bell $1^a$ so as to leave an adjusting-space 5, as shown, the set-screw 4 holding the ring in place. As the bearing-face $3^a$ wears down the set-screw 4 may be loosened and the ring 3 screwed farther into the bell $1^a$ to take up the wear, after which the set-screw 4 may be again tightened up. In this position the bearing-face $2^b$ of the ball $2^a$ of the ball member 2 is in close contact with both the flange $1^b$ and bearing-face $3^a$ of the ring 3.

When it is desired to use my coupling as a steam-pipe coupling, I invert the ring 3 from the position shown in Fig. 1 to that shown in Fig. 2, from which it will be seen the flange $3^e$ tightly engages the flange $1^d$ and, if desired, the set-screw 4 may be omitted, or it may be used to lock the ring 3 in place, if desired. The ball-section 2 and socket-section 1 are each provided with suitable taps $2^x$ and $1^x$ and nut portions $2^y$ and $1^y$, respectively, for the usual purposes. The arrangement of the several parts is such that the ball can be turned universally through an angle of twenty degrees from the position shown in Fig. 1—viz., the position in which the taps $1^x$ and $2^x$ are in straight alinement. The bearing-face $2^b$ of the ball $2^a$ is of such area that it will always be in contact with the bearing-surface $1^c$ of the flange $1^b$ when the parts are in the position shown in Fig. 1 and out of engagement with the flange $1^b$ when the parts are in the position shown in Fig. 2.

From the foregoing it will be seen that I have provided a very simple, effective, and easily-adjusted coupling which can be cheaply manufactured and which is composed of a minimum number of parts. Again, should it be desired to have the coupling for use on liquid-pipes only or upon steam-pipes only the ring 3 can be made, as shown in Fig. 5, with equal spherical bearing-faces and with the threaded outer surface of equal length, the flange 3ᵉ being then midway between the ends of the ring. Thus the bearing-ring may be reversed as when the bearing-surface wears down and used with the other bearing-surface until that has been worn down before it becomes necessary to renew the ring.

From the foregoing description, taken in connection with the accompanying drawings, it is thought the complete construction, operation, and numerous advantages of my invention will be readily understood by those skilled in the art to which it appertains, and I desire it understood that numerous slight changes in the detailed construction and design may be readily made without departing from the spirit of the invention or the scope of the appended claims.

Having thus described my invention, what I claim, and desire to secure by Letters Patent, is—

1. In a flexible pipe-joint, the combination with a ball member and a bell member, of an internally-reversible and double-faced bearing-ring having an external annular flange and a pair of unequal externally-threaded faces, said bell member having an internally-threaded portion to receive said ring, substantially as shown and described.

2. In a flexible pipe-joint, the combination with a ball member and a bell member, of an internally-reversible and double-faced bearing-ring having an external annular flange and a pair of unequal externally-threaded faces, said bell member having an internally-threaded portion to receive said ring; and means carried by the ring-flange for engaging the bell member to lock the ring in place.

3. The combination with a ball member and a bell member, the bell member having an internal bearing-flange, a threaded mouth and a flange surrounding the mouth, of a reversible bearing-ring having a pair of equal internal bearing-faces and an external annular flange and externally-threaded portions that coöperate with the bell-mouth, said externally-threaded portions of the ring being of different relative length.

4. The combination with a ball member and a bell member, the bell member having an internal bearing-flange, a threaded mouth and a flange surrounding the mouth, of a reversible bearing-ring having a pair of equal internal bearing-faces and an external annular flange and externally-threaded portions that coöperate with the bell-mouth, said externally-threaded portions of the ring being of different relative length, and a set-screw passing through the ring-flange and engaging the bell-flange.

HENRY S. STUCY.

Witnesses:
Wm. H. Pauk,
A. A. Gils.